(12) United States Patent
Gunderson et al.

(10) Patent No.: US 10,491,549 B2
(45) Date of Patent: Nov. 26, 2019

(54) MANAGING MODALITY VIEWS ON CONVERSATION CANVAS

(71) Applicant: Microsoft Technology Licensing, LLC, Redmond, WA (US)

(72) Inventors: Nathan Gunderson, Seattle, WA (US); Alexander Darrow, Seattle, WA (US); Zhaoqing Ma, Sammamish, WA (US); Punit Java, Seattle, WA (US); Christina Marie Meyer, Seattle, WA (US); Steve Chang, Kirkland, WA (US); Leslie Cindy Chen, Bellevue, WA (US); Eric Hamilton, Bothell, WA (US); Marcelo Truffat, Woodinville, WA (US)

(73) Assignee: Microsoft Technologicy Licensing, LLC, Redmond, WA (US)

( * ) Notice: Subject to any disclaimer, the term of this patent is extended or adjusted under 35 U.S.C. 154(b) by 0 days.

(21) Appl. No.: 16/002,203

(22) Filed: Jun. 7, 2018

(65) Prior Publication Data
US 2018/0351886 A1    Dec. 6, 2018

Related U.S. Application Data

(63) Continuation of application No. 14/732,460, filed on Jun. 5, 2015, now Pat. No. 10,009,298, which is a
(Continued)

(51) Int. Cl.
*G06F 3/048* (2013.01)
*H04L 12/58* (2006.01)
(Continued)

(52) U.S. Cl.
CPC .......... *H04L 51/043* (2013.01); *G06F 3/0481* (2013.01); *G06F 3/04855* (2013.01);
(Continued)

(58) Field of Classification Search
CPC .. H04L 51/043; H04L 51/046; H04L 65/1083
(Continued)

(56) References Cited

U.S. PATENT DOCUMENTS 8,285,785 B2    10/2012  Ekholm et al.
9,667,799 B2 *   5/2017  Olivier ................ H04L 65/1016
(Continued)

*Primary Examiner* — David Phantana-angkool

(57) ABSTRACT

A single communication application can display an initial modality view associated with the group communication on a canvas of a communication application user interface. The initial modality view can be one of multiple available views. The single communication application can receive a selection to display a different from the initial modality view. Each active user in the group communication can be on a different computing device with different active instances of the single communication application which are each configured to switch independently of each other active instances of the single communication application running on different computing devices to modality views that are different from the initial modality view. The communication application can display the selected modality view on the canvas by transitioning from the initial modality view.

38 Claims, 8 Drawing Sheets

Related U.S. Application Data continuation of application No. 13/615,849, filed on Sep. 14, 2012, now Pat. No. 9,083,816.

(51) Int. Cl.

| | | |
|---|---|---|
| *H04L 29/06* | (2006.01) | |
| *G06F 3/0485* | (2013.01) | |
| *G06F 3/0481* | (2013.01) | |
| *H04M 1/725* | (2006.01) | |
| *G06F 3/0488* | (2013.01) | |

(52) U.S. Cl.
CPC ........ *H04L 51/046* (2013.01); *H04L 65/1083* (2013.01); *H04M 1/72552* (2013.01); *G06F 3/04883* (2013.01)

(58) Field of Classification Search
USPC ......................................................... 715/753
See application file for complete search history.

(56) References Cited

U.S. PATENT DOCUMENTS

| | | | |
|---|---|---|---|
| 9,755,847 B2* | 9/2017 | Clavel | H04L 12/1822 |
| 9,942,519 B1* | 4/2018 | Pan | H04L 65/1093 |
| 9,948,786 B2* | 4/2018 | Rosenberg | H04L 65/403 |
| 2010/0246571 A1 | 9/2010 | Geppert et al. | |
| 2011/0119389 A1 | 5/2011 | Cavin et al. | |

* cited by examiner

MANAGING MODALITY VIEWS ON CONVERSATION CANVAS

CROSS REFERENCE TO RELATED APPLICATIONS

This application is a continuation of, and claims priority to, U.S. patent application Ser. No. 14/732,460, entitled "MANAGING MODALITY VIEWS ON CONVERSATION CANVAS," filed on Jun. 5, 2015, and which is hereby incorporated by reference in its entirety. This application also claims priority to U.S. patent application Ser. No. 13/615,849, filed on Sep. 14, 2012, and entitled "MANAGING MODALITY VIEWS ON CONVERSATION CANVAS," which issued as U.S. Pat. No. 9,083,816 on Jul. 14, 2015, and which is hereby incorporated by reference in its entirety.

BACKGROUND

Computer applications interact with human beings through user interfaces. While audio, tactile, and similar forms of user interfaces are available, visual user interfaces through a display device are the most common form of user interface. With the development of faster and smaller electronics for computing devices, smaller size devices such as handheld computers, smart phones, tablet devices, and comparable devices have become common. Such devices execute a wide variety of applications ranging from communication applications to complicated analysis tools. Many such applications render visual effects through a display and enable users to provide input associated with the applications' operations.

Seamless continuity among touch enabled application interfaces proves a hard challenge to surmount in modern solutions. Many portable software solutions solve limited screen surface problems by limiting provided functionality and reducing presented features compared to desktop software. Similarly, some software solutions overload small screens with too much functionality. Other providers offer server based solutions in which computing and presentation is done in server side. Server based solutions enable devices with limited resources, such as smaller screen size, to overcome lack of local resources. However, such solutions become cumbersome to use where network connectivity is less than reliable. Continuity between application functionality may also be less than satisfactory based on how integration between server and client components are handled during development and managed post deployment during the lifecycle of the product. As a result, continuity in user interface components of an application for mobile devices is rarely optimal.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to managing multiple modality views of communication channels supported by a single communication application with a communication application user interface that provides a group communication associated with a plurality of users. In some embodiments, an initial modality view associated with the group communication can be displayed (e.g., on a display of the computing device) on a canvas of the communication application user interface. The initial modality view can be a first view that includes a user interface that displays an item shared amongst a plurality of active users of the group communication, a second view that includes a user interface that displays each active user of the group communication, or a third view that includes a user interface that displays user-to-user communications of active users of the group communication. A selection to display the first view, the second view, or the third view that is different from the initial modality view can be received. Each active user can be on a different computing device with different active instances of the single communication application which are each configured to switch independently of each other active instances of the single communication application running on different computing devices to modality views that are different from the initial modality view. The selected modality view can then be displayed on the canvas by transitioning from the initial modality view.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
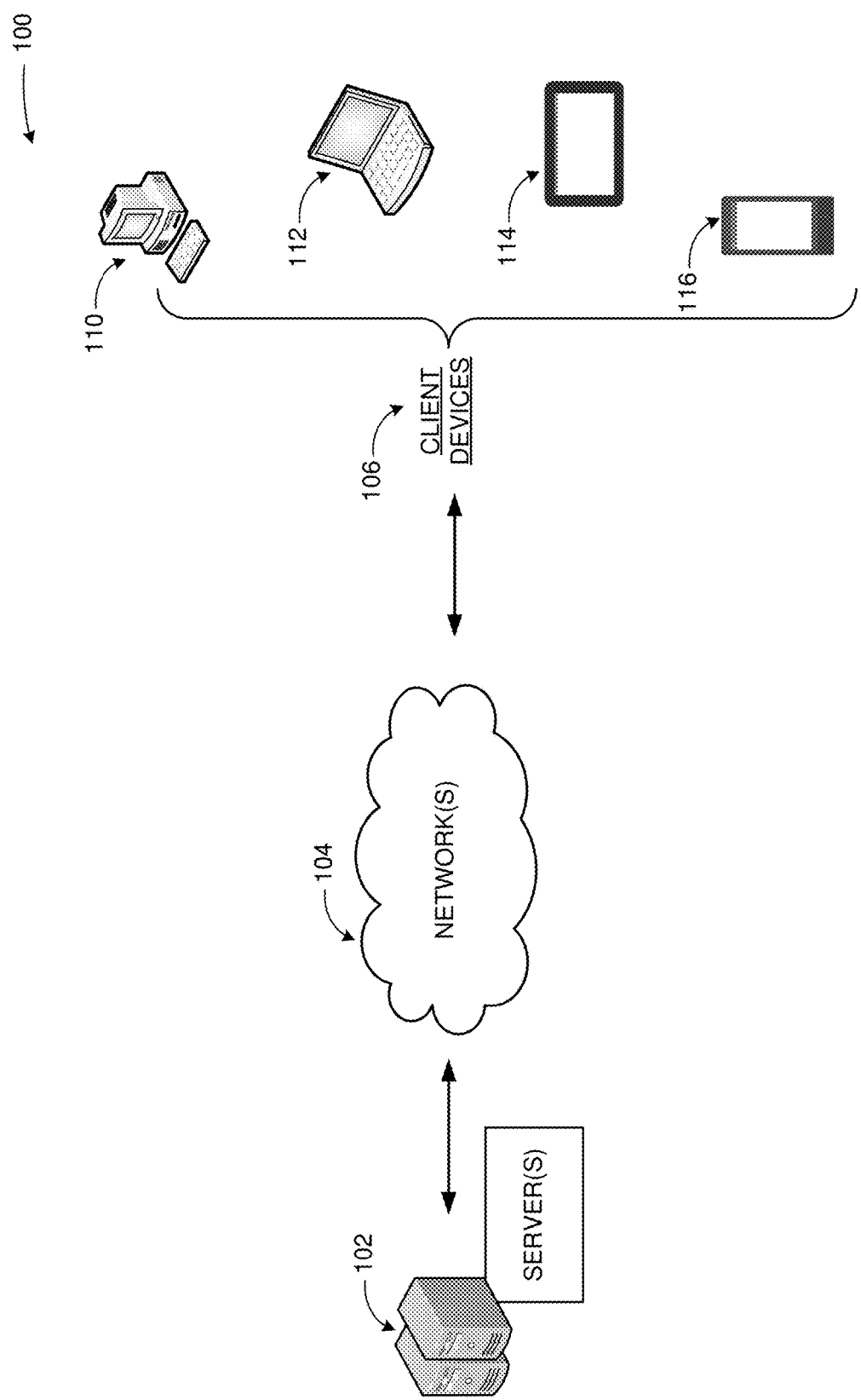
FIG. 1 illustrates an example network diagram where a communication application may manage modality views on a conversation canvas of a display device according to some embodiments.

As briefly described above, a communication application may manage modality views on a conversation canvas of a display device. The conversation canvas may display associated collaboration, gallery, and messaging views and transition fluidly between the views according to user actions. In some embodiments, affordances or hints may be provided to the other views in each view. For example, in the gallery view the user may see just the corner of the messages so they know to swipe to see all of them. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present disclosure is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a non-transitory computer-readable memory device. The computer-readable storage medium can for example be implemented via one or more of a volatile computer memory, a non-volatile memory, a hard drive, a flash drive, a floppy disk, or a compact disk, and comparable media.

According to embodiments, a conversation canvas may host modality views for a communication application. The modalities may represent different use scenarios of the communication application such as messaging and collaboration scenarios. Two or more users may use a messaging view to exchange messages among each other. Messaging view may provide a traditional text messaging functionality. Alternatively, the messaging view may enable users to exchange messages in other forms such as audio, video, context based messages, etc. A gallery view may enable users to add or subtract users from ongoing conferences and conversations. A collaboration view may encompass a wide variety of information exchange including desktop, file, presentations, whiteboard, online poll, etc. Embodiments include the canvas capable of dynamically generating the views and transition content related to an ongoing conversation among the views according to user actions selecting one of the views. A user may be a person interacting with the views through a device displaying the conversation canvas. Participants may include the user as well as other persons communicating with the user through the communication application.

Throughout this specification, the term "platform" may be a combination of software and hardware components for managing modality views on conversation canvas. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Referring to FIG. 1, diagram 100 illustrates an example network diagram where a communication application may manage modality views on a conversation canvas according to some embodiments. The components and environments shown in diagram 100 are for illustration purposes. Embodiments may be implemented in various local, networked, cloud-based and similar computing environments employing a variety of computing devices and systems, hardware and software.

In an example environment illustrated in diagram 100, one or more servers 102 may host server component of a communication application managing and providing connectivity functionality between users of client devices 106. Connectivity may take the form of variety of communication modalities including audio, video, and data sharing and may include context aware communication dynamically adding or subtracting features depending on detected settings of a conversation. An example may include automatically enabling video conferencing for users with detected minimal hardware and privileges to carry a video conversation. The servers 102 may communicate with client devices 106 through networks 104. The network(s) 104 may be any network architecture providing access to the servers 102 through wired or wireless technology.

Client devices 106 may include a variety of hardware such as desktop computer 110, laptop computer 112, a tablet device 114 such as a slate, and a smart phone 116. The client devices 106 may execute a client component of a communication application providing a conversation canvas through the client devices' display surfaces. The client devices 106 may communicate with a server component of the communication application at servers 102. The conversation canvas may provide a set of modality views to provide associated views displaying different features of the communication application.

The example scenarios above describe the communication application in a client-server architecture. Alternatively, the communication application may work in a peer-to-peer architecture in which client devices 106 execute the communication application locally. In a peer-to-peer architecture, the client devices may communicate directly with each other instead of a server managing and monitoring the conversations between client devices 106.

Figure 2:
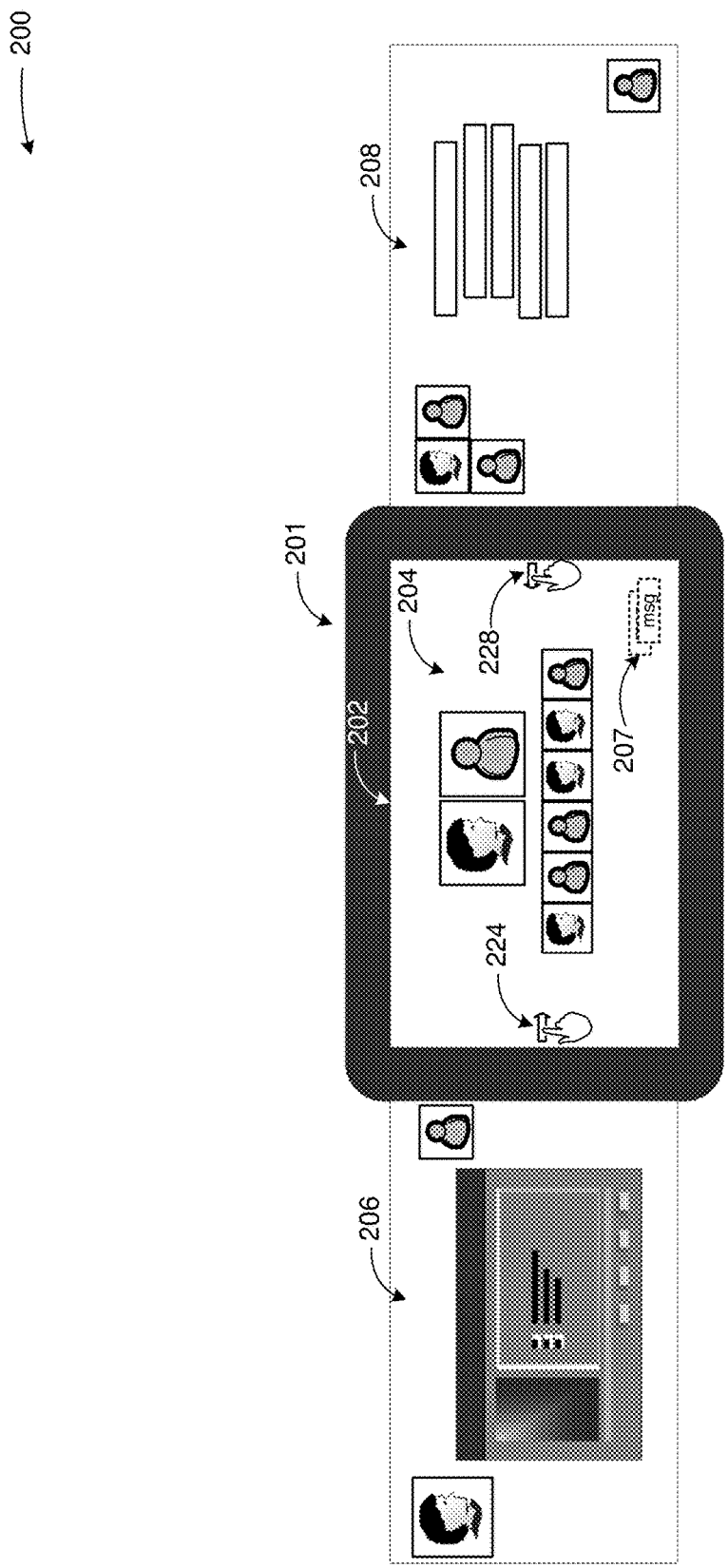
FIG. 2 illustrates an example of a communication application displaying collaboration, gallery, and messaging modality views on a conversation canvas according to embodiments.

FIG. 2 illustrates an example of a communication application displaying collaboration, gallery, and messaging modality views on a conversation canvas according to embodiments. Diagram 200 displays an example device such as a tablet 201 executing a communication application utilizing the conversation canvas 202.

A communication application, according to embodiments, may display modality views on canvas 202. The application may provide a gallery view 204 by default to enable a user to select participants in a new conversation. A gallery view may provide images, representations (e.g., avatars), videos, etc. of participants in a conversation in a pre-configured format such as selected (or active) participants presented differently from others (e.g., inactive participants). The application may configure the gallery view 204 according to a context of an existing conversation. The gallery view 204 may display users participating in the conversation and may provide a list of suggested users to add to the conversation. The suggested list of users may be determined according to user information such as a contact list of a conversation participant. Alternatively, the suggested participants may be determined according to organizational settings such as a participant's relations with contacts. The relations may be determined and evaluated according to frequency of conversations with contacts and other criteria such as an organizational hierarchy linking the participant with a suggested contact.

In some embodiments, the user may initiate user action 228 switching to (sliding) to conversation view 208 from gallery view 202 upon seeing a hint of messages 207 while on the gallery view 202. The application may generate the conversation view 208 according to the existing criteria in the gallery view 202. The existing criteria may include participants. The application may generate the messaging view 208 by partitioning conversing parties across sections of the view. An example may include positioning one or more participants on a left section of the view 208 and another set of participants on a right section of the view 208. The messaging history and current message may be displayed in a middle section of the view 208.

Another detected user action 224 may initiate configuration of a collaboration view 206. A common example of a collaboration view may include desktop sharing in which a desktop of one of the participants is displayed in the middle of the view 206. The collaboration view 206 may also display participants in opposing sections.

The user actions 224 and 228 may include a tap, a swipe, a tap and hold, a gesture combination, an audio command, a gesture detected through a video camera, etc. Furthermore, an accelerometer may be used in the device, so tilting the device may move it from one view to the other. For example, a tilt left may switch from gallery view 202 to conversation view 208. While displaying a gallery view 204, the application may switch to a collaboration view 206 or a messaging view 208 according to a detected user action. While displaying a collaboration view 206, the application may switch to a gallery view 204 according to the detected user action. While displaying a messaging view 208, the application may switch to a gallery view 204 according to a detected user action.

Figure 3:
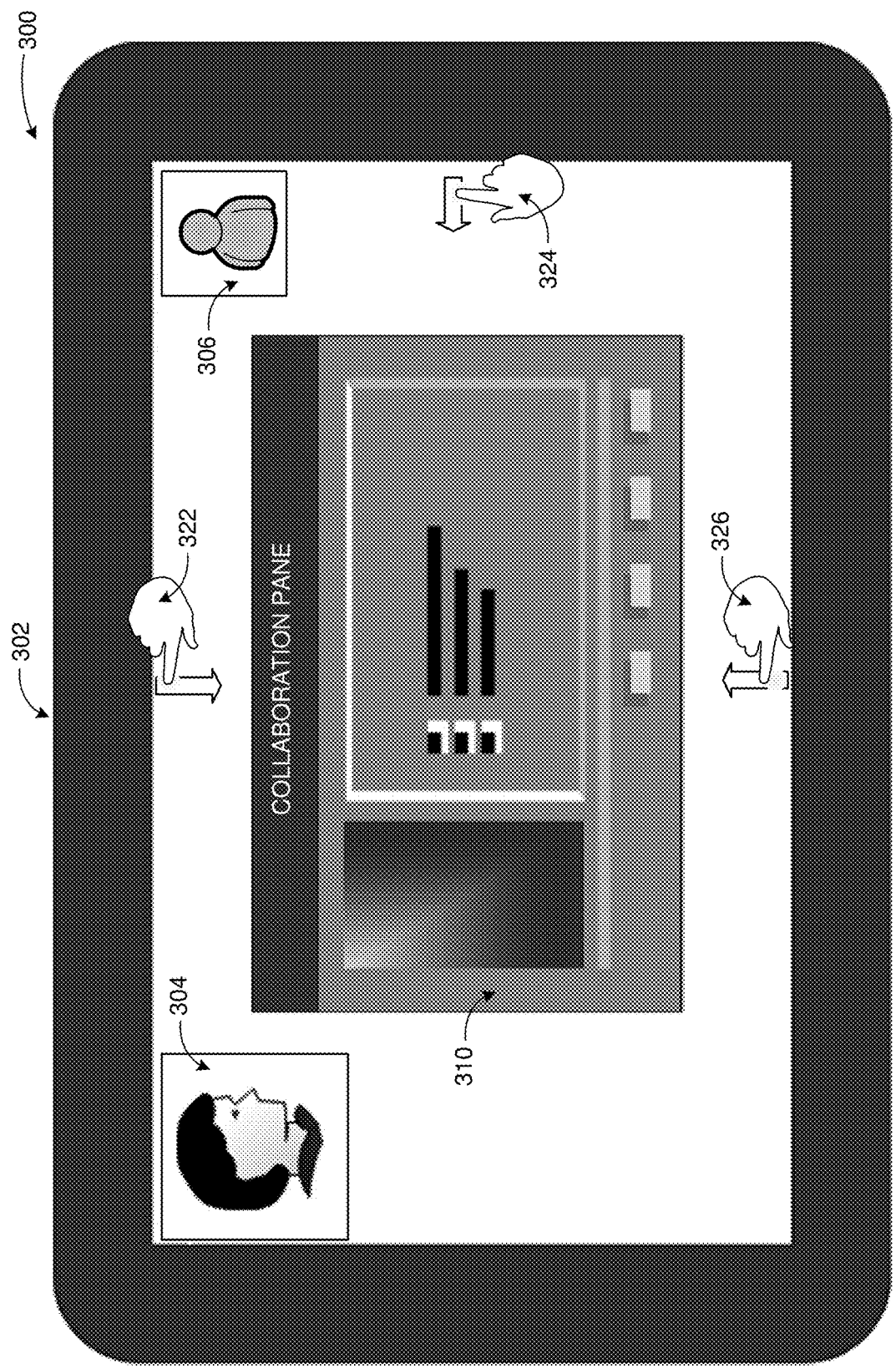
FIG. 3 illustrates a collaboration modality view displayed on a conversation canvas according to embodiments.

FIG. 3 illustrates a collaboration modality view displayed on a conversation canvas according to embodiments. Diagram 300 displays a conversation canvas showing collaboration modality view 302. The collaboration view 302 may display functionality that participants of conversation may share.

The collaboration view 302 may display a graphic or a video representing the participants 304 and 306. The application may automatically enable a video stream of the participants subsequently determining supporting hardware on respective client devices. The application may also check for organization policies and personal rules prior to activating video streaming of participants.

The application may also display a collaboration pane 310. The collaboration pane may display item(s) shared by the participants. The shared item may include a user's desktop, a presentation, a file, media such as audio and video, etc. User actions 322 and 326 may launch an application and/or navigation bar to enable the user to control the communication application. User actions 322 and 326 may include tap, swipe, gesture, accelerometer-related move, and combination actions as described above.

The application may also adjust the size of the collaboration to accommodate the screen area of a device used by the participant. The application may position the canvas to cover the full screen area of the device. The application may also scale the view 302 to a full screen size of the conversation canvas by rearranging displayed components of the communication application to optimally present a modality. In an example scenario, the collaboration pane 310 may be positioned to provide optimum view resolution to the participant. The application may minimize the size of the participant panes 304 and 306 to provide additional space to the collaboration pane to fit more content into the collaboration pane. Optimizing the collaboration pane size may aide in viewing complex content such as such as desktop sharing by providing additional screen area.

The conversation canvas 302 may also retain a participant session while a user switches between views. When a participant switches to a gallery view through user action 324, the application may store the collaboration session while the participant participates in other modalities. Upon returning to the collaboration view 302, the application may restore the collaboration session by continuing the share session. An example may include restoring a desktop sharing session between the participants. In addition, the application may present the collaboration view 302 by default on the canvas subsequent to the participant selecting a sharing component while launching the communication application.

Figure 4:
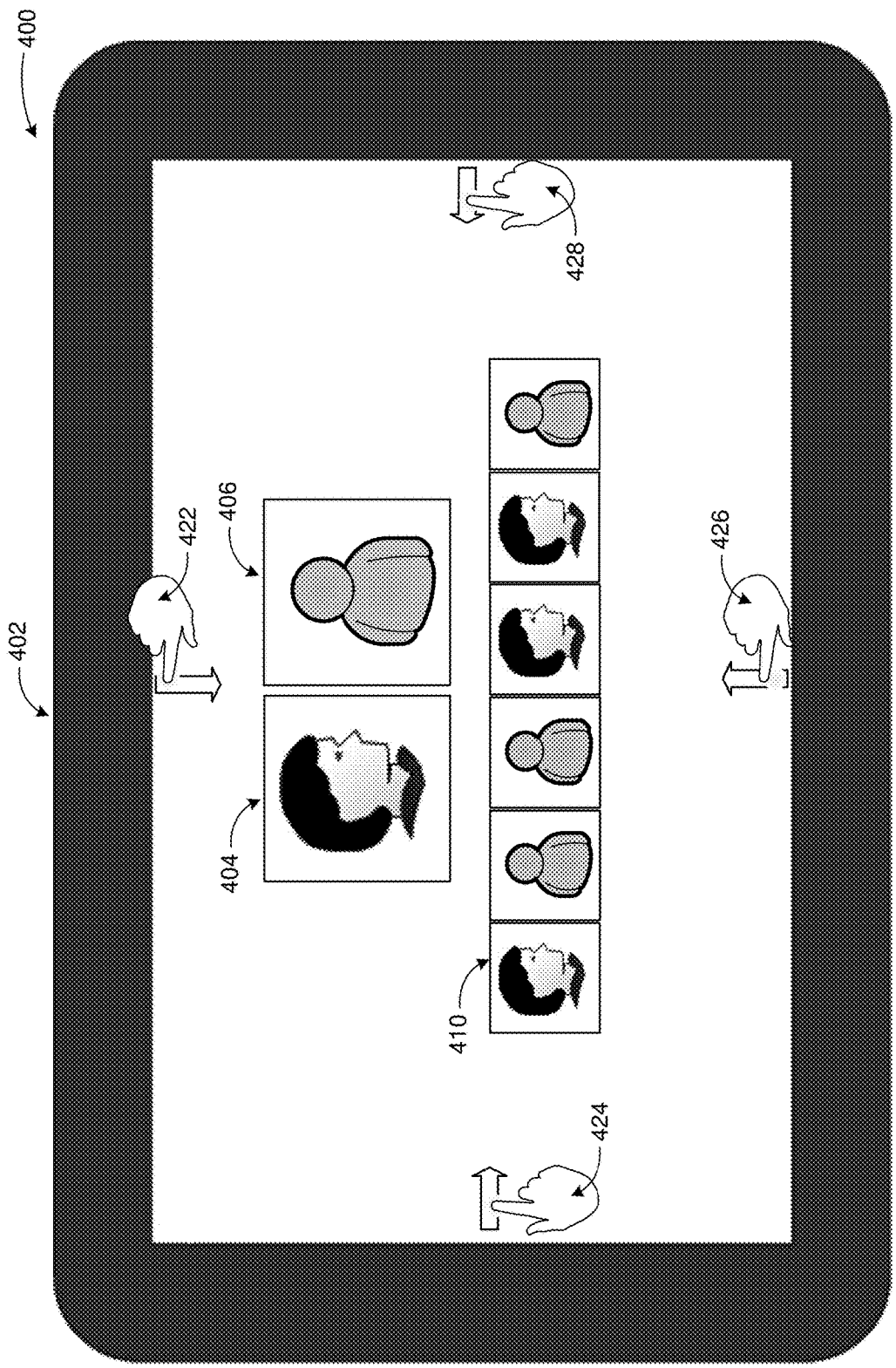
FIG. 4 illustrates a gallery view displayed on a conversation canvas according to embodiments.

FIG. 4 illustrates a gallery view displayed on a conversation canvas according to embodiments. Diagram 400 displays a gallery view 402 displaying participants of a conversation.

The communication application may display the gallery view 402 on the conversation canvas subsequent to detecting the participants connecting to view or talk to each other through a video or audio call. The application may display current participants 404 and 406 on a top row with enlarged participant panes. The participant panes may contain the participant picture, a user-generated avatar of the participant, or a video stream of the participant. The video stream of the participants may be started automatically or manually as described previously. In another list 410, the application may display potential contacts to add to the conversation. The contacts may be retrieved from participants' contacts or determined through an analysis of users suitable to be added to the conversation according to the context of the conversation. The application may display multiple participants and scale the size of participant panes to fit into the view all the participants. Alternatively, the application may display a limited number of participant panes but may alternate between participants according to a predetermined schedule to display all participants in the view. The limited number of participant panes may be scrollable to enable a user to view all the participants while accommodating the width of the conversation canvas. In addition, the list 410 may be a scrollable list displaying a limited number of contacts to optimally display a contact's identifying features on the list 410 while accommodating the width of the conversation canvas. In other embodiments, a "zoom out" feature may be provided to see an entire list of people using the zoom gesture on touch surfaces. Furthermore, all participant panes and contact panes of collaboration, gallery, and messaging views may display participant or contact presence status through indicators such as highlighting or status bars displayed in the panes.

The application may also enable a participant to add or subtract other participants by interacting with one of the participant panes 404 or 406. Subsequent to detecting a user action on a pane 404 or 406, the application may drop a participant from the conversation subsequent to confirming the user's authority to drop a participant. Similarly, the application may add a contact as a participant subsequent to detecting a user selecting one of the contact panes in list 410. The application may refresh the participants and contacts subsequent to detecting an addition or removal of participant (s) from a conversation.

The communication application may also display application and/or navigation menu subsequent to detecting a user action 422 or 426. The user action 422 and 426 may be detected in top and bottom sections of the gallery view. In addition, the application may retain session information for the gallery view to enable a user to come back to the session of the gallery view upon switching to one of the other views. The application may restore session information into the gallery view to restore participant panes and contact list 410 from previous session subsequent to detecting the user switching back to the gallery view from another view. The session may be retained according to a system setting such as a predetermined time. The system setting may be user configurable.

The application may switch to collaboration view from the gallery view subsequent to detecting user action 424 at a left region of the gallery view 402. Alternatively, the application may switch to messaging view subsequent to detecting a user action 428 at a right region of the gallery view 402. The user actions 424 and 428 may be a tap, a swipe, a gesture, a keyboard/mouse action, etc., as discussed previously. Subsequent to detecting a keyboard or a mouse action, the application may display a button in sections corresponding to user actions 422, 424, 426, and 428 to enable the user to activate commands corresponding to the user actions through a keyboard or a mouse action on the button controls within the view 402.

Figure 5:
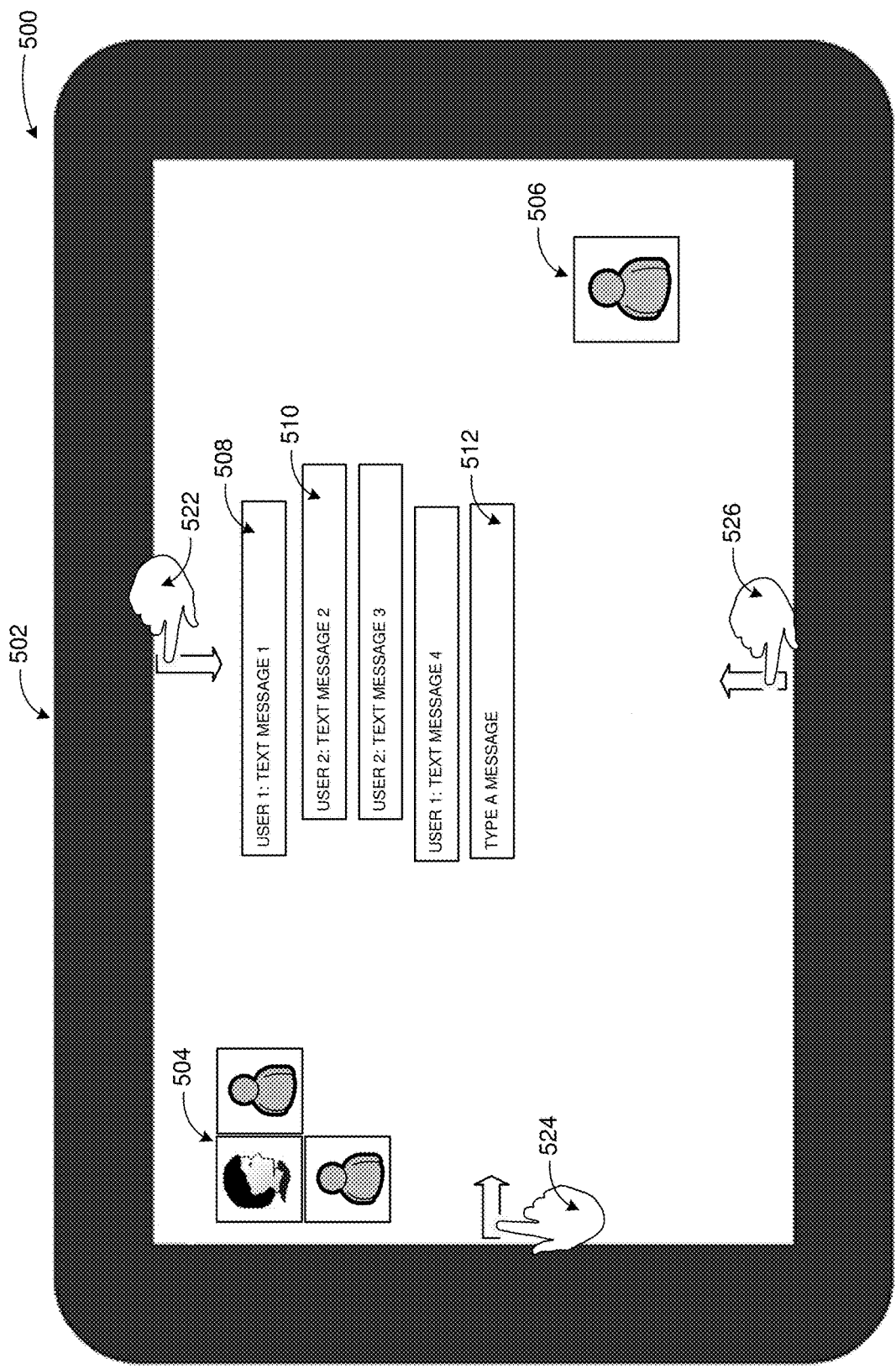
FIG. 5 illustrates a messaging view displayed on a conversation canvas according to embodiments.

FIG. 5 illustrates a messaging view displayed on a conversation canvas according to embodiments. Diagram 500 may display a device showing messaging modality view 502 on a conversation canvas of a communication application.

The application may display the messaging view subsequent to detecting the user launching the communication application to access a messaging component. The application may configure the messaging view 502 according to detected participants from an earlier modality or from participant requests to exchange messages with the user. The application may partition the participants according to groups. The application may locate participant panes 504 in an opposite region of the canvas compared to another group of participant 506. The participant panes may contain a picture, a video stream, or an icon of the participant. As discussed previously, the video streaming or displaying a picture of the participant may be automatically determined according to device hardware capabilities and user privileges to receive video or see information about the participant. In an example scenario, a participant with low privileges to participate may be restricted to view icons of other participants instead of video streams or pictures of other participants.

The application may position message streams according to a participant. In an example scenario, the application may place a message 510 from user 2 indented compared to a message 508 from user 1. The application may group messages according to user and differentiate groups of messages between users by adjusting the positions of the messages horizontally. The application may also include a text box 512 to have the user enter a new message to a participant. The application is not limited to text messages as a modality in the message view. A participant may communicate with others in audio mode, which may be transcribed and presented in the messaging view subsequent to detecting a audio conversation between the participants. Speech recognition and speech-to-text capability may be also provided. In addition, the application may be enabled to capture gestures and present as messages in the messaging view. An example may include capturing hand gestures used in sign language and present as text messages or as a graphic describing the gesture in the messaging view subsequent to detecting a sign conversation.

The application may also detect user actions 522 and 526 to launch navigation and/or application menus. A participant navigating to a conversation using the navigation menu may be returned to a previous view. In an example scenario, if the application is displaying the messaging view and detects the user selecting a conversation in the navigation bar, the application may transition to display the gallery view if the gallery view was displayed prior to the messaging view.

The application may also retain session information about the messaging view 502. In case a user switches to another view and switches back to the messaging view 502, the application may restore the session and display the messaging history and participants of the conversation. A user may also see new messages coming in (but not full content) when in messaging view 502. In addition, the application may also detect a user action 524 in a left section of the canvas to dynamically generate and switch to the gallery view. If any participants may have been dropped or added to the conversation, the application may update the gallery view during configuration and switch to the gallery view subsequent to the user action 524.

Embodiments are not limited to collaboration, gallery, and messaging views presented through a conversation canvas of communication application. Other modalities or combinations may be presented in described embodiments or in similar views. In an example scenario, the application may present a rendering view to present conversations and participants using 3 dimensional objects and environments.

The example scenarios and schemas in FIG. 2 through 5 are shown with specific components, data types, and configurations. Embodiments are not limited to systems according to these example configurations. Managing modality views on a conversation canvas of a communication application may be implemented in configurations employing fewer or additional components in applications and user interfaces. Furthermore, the example schema and components shown in FIG. 2 through 5 and their subcomponents may be implemented in a similar manner with other values using the principles described herein.

Figure 6:
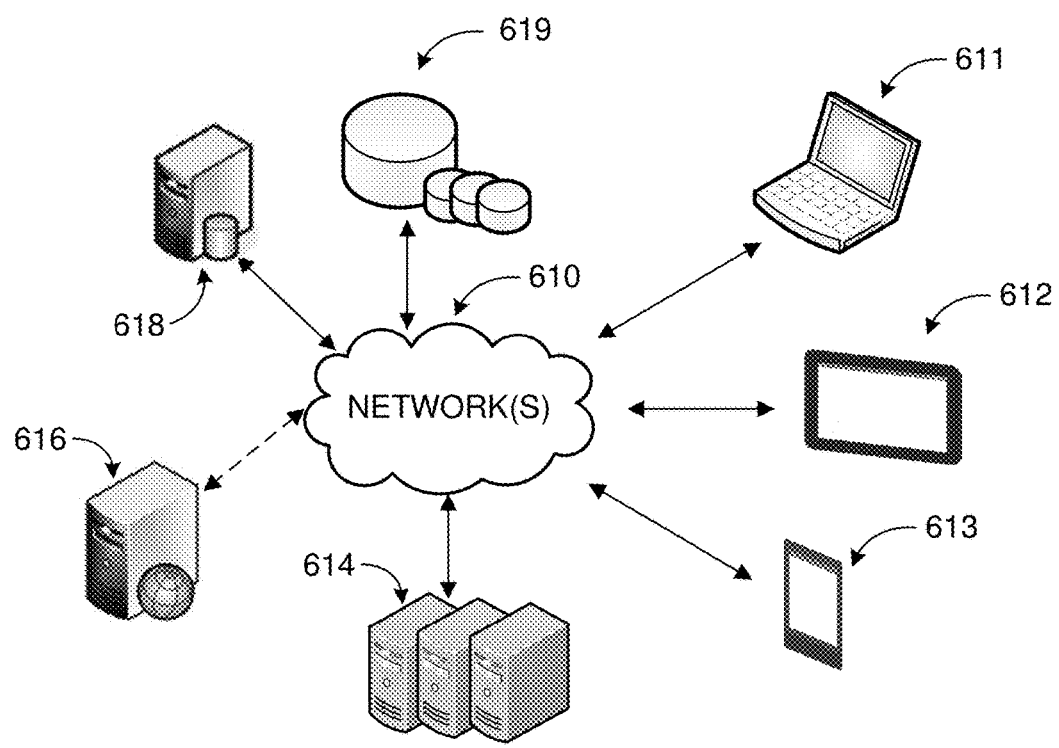
FIG. 6 is a networked environment, where a system according to embodiments may be implemented.

FIG. 6 is a networked environment, where a system according to embodiments may be implemented. Local and remote resources may be provided by one or more servers 614 or a single server (e.g. web server) 616 such as a hosted service. A communication application may communicate with client interfaces on individual computing devices such as a smart phone 613, a tablet device 612, or a laptop computer 611 ('client devices') through network(s) 610.

As discussed above, a communication application may manage modality views on a conversation canvas. The application may display one of the collaboration, gallery, and messaging views according to a context of the conversation among participants. The application may retain a session of a view to restore the session upon a user switching back to the view. Client devices 611-613 may enable access to applications executed on remote server(s) (e.g. one of servers 614) as discussed previously. The server(s) may retrieve or store relevant data from/to data store(s) 619 directly or through database server 618.

Network(s) 610 may comprise any topology of servers, clients, Internet service providers, and communication media. A system according to embodiments may have a static or dynamic topology. Network(s) 610 may include secure networks such as an enterprise network, an unsecure network such as a wireless open network, or the Internet. Network(s) 610 may also coordinate communication over other networks such as Public Switched Telephone Network (PSTN) or cellular networks. Furthermore, network(s) 610 may include short range wireless networks such as Bluetooth or similar ones. Network(s) 610 provide communication between the nodes described herein. By way of example, and not limitation, network(s) 610 may include wireless media such as acoustic, RF, infrared and other wireless media.

Many other configurations of computing devices, applications, data sources, and data distribution systems may be employed to manage modality views on a conversation canvas. Furthermore, the networked environments discussed in FIG. 6 are for illustration purposes only. Embodiments are not limited to the example applications, modules, or processes.

Figure 7:
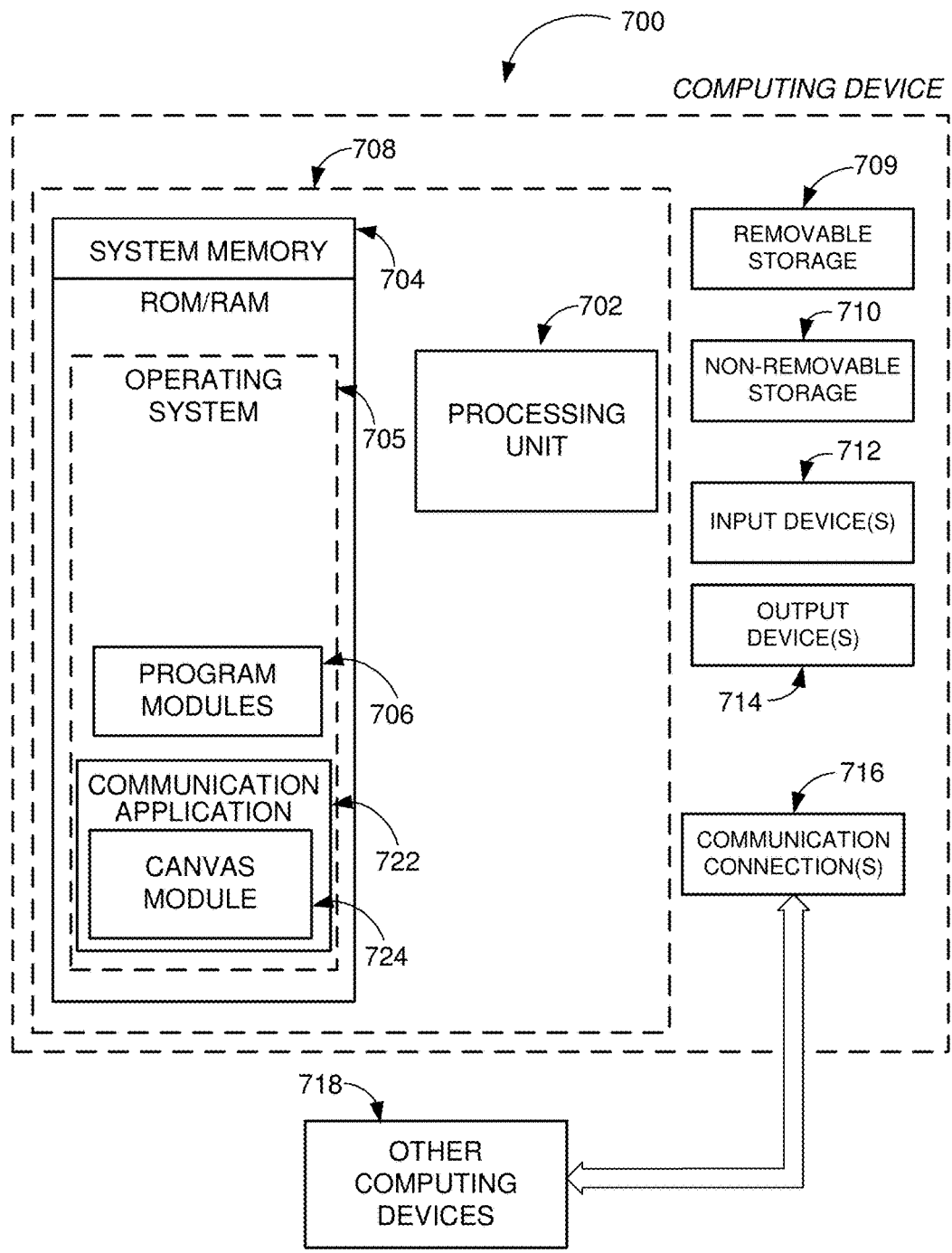
FIG. 7 is a block diagram of an example computing operating environment, where embodiments may be implemented.

FIG. 7 and the associated discussion are intended to provide a brief, general description of a suitable computing environment in which embodiments may be implemented. With reference to FIG. 7, a block diagram of an example computing operating environment for an application according to embodiments is illustrated, such as computing device 700. In a basic configuration, computing device 700 may include at least one processing unit 702 and system memory 704. Computing device 700 may also include a plurality of processing units that cooperate in executing programs. Depending on the exact configuration and type of computing device, the system memory 704 may be volatile (such as RAM), non-volatile (such as ROM, flash memory, etc.) or some combination of the two. System memory 704 typically includes an operating system 705 suitable for controlling the operation of the platform, such as the WINDOWS® and WINDOWS PHONE® operating systems from MICROSOFT CORPORATION of Redmond, Wash. The system memory 704 may also include one or more software applications such as program modules 706, a communication application 722, and canvas module 724.

The communication application 722 may provide a display surface of a device with a view from a set of: collaboration, gallery, and messaging views according to embodiments. The canvas module 724 may configure and display the modality view according to the conversation context and association with a prior view. Examples may include arranging participant panes in a collaboration view according to participants selected at a gallery view. This basic configuration is illustrated in FIG. 7 by those components within dashed line 708.

Computing device 700 may have additional features or functionality. For example, the computing device 700 may also include additional data storage devices (removable and/or non-removable) such as, for example, magnetic disks, optical disks, or tape. Such additional storage is illustrated in FIG. 7 by removable storage 709 and non-removable storage 710. Computer readable storage media may include volatile and nonvolatile, removable and non-removable media implemented in any method or technology for storage of information, such as computer readable instructions, data structures, program modules, or other data. Computer readable storage media is a non-transitory computer readable memory device. System memory 704, removable storage 709 and non-removable storage 710 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer readable storage media may be part of computing device 700. Computing device 700 may also have input device(s) 712 such as keyboard, mouse, pen, voice input device, touch input device, and comparable input devices. Output device(s) 714 such as a display, speakers, printer, and other types of output devices may also be included. These devices are well known in the art and need not be discussed at length here.

Computing device 700 may also contain communication connections 716 that allow the device to communicate with other devices 718, such as over a wireless network in a distributed computing environment, a satellite link, a cellular link, and comparable mechanisms. Other devices 718 may include computer device(s) that execute communication applications, storage servers, and comparable devices. Communication connection(s) 716 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be co-located with each other, but each can be only with a machine that performs a portion of the program.

Figure 8:
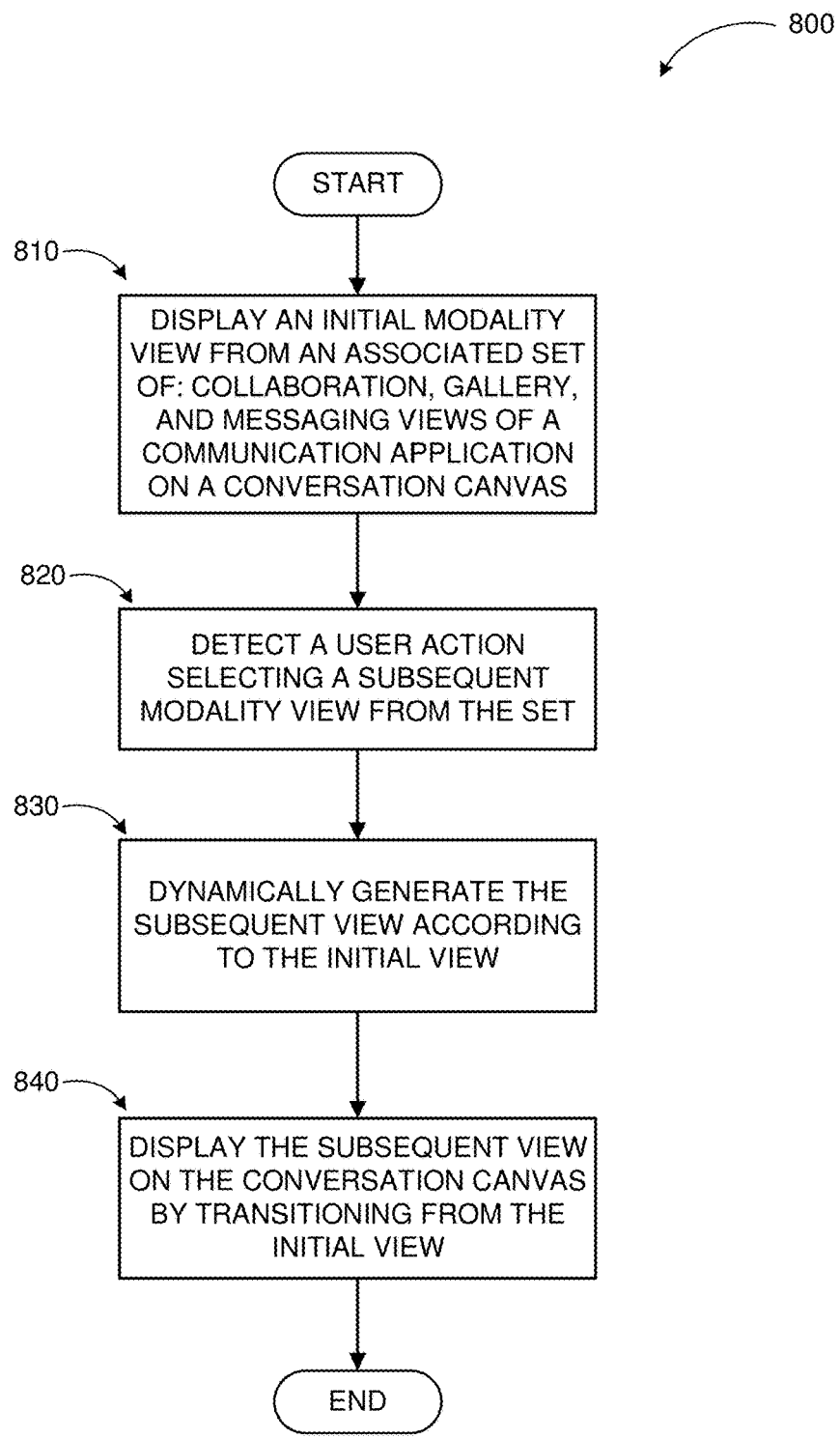
FIG. 8 illustrates a logic flow diagram for a process managing modality views on a conversation canvas according to embodiments.

FIG. 8 illustrates a logic flow diagram for a process managing modality views on a conversation canvas according to embodiments. Process 800 may be implemented by an application such as a communication application in some examples.

Process 800 may begin with operation 810 where a communication application may display an initial modality view from an associated set of: collaboration, gallery, and messaging views. The views may be launched according to a selection by a user. The application may display the gallery view for a user connecting to converse with another user for an audio or video call. At operation 820, the application may detect a user action selecting a subsequent modality view from the set. The user action may include a tap, a swipe, a gesture, a mouse, a keyboard, a voice command, a visual cue action.

The application may dynamically generate the subsequent modality view according to the initial view at operation 830.

The application may use the participants from the initial view in the subsequent view along with their modality of communication including audio, video, textual, etc. Next, the application may display the subsequent view on the conversation canvas by transitioning from the initial view to the subsequent view at operation 840. The transition may include a smooth movement from the initial view to the subsequent view.

Some embodiments may be implemented in a computing device that includes a communication module, a memory, and a processor, where the processor executes a method as described above or comparable ones in conjunction with instructions stored in the memory. Other embodiments may be implemented as a computer readable storage medium with instructions stored thereon for executing a method as described above or similar ones.

The operations included in process 800 are for illustration purposes. Managing modality views on a conversation canvas of a communication application according to embodiments may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed on a computing device for managing multiple modality views of communication channels supported by a single communication application with a communication application user interface that provides a group communication associated with a plurality of users, the method comprising:
    displaying, on a display of the computing device, an initial modality view associated with the group communication on a canvas of the communication application user interface,
        wherein the initial modality view is a collaboration modality view that includes a user interface that displays an item shared amongst a plurality of active users of the group communication, a gallery modality view that includes a user interface that displays each active user of the group communication, or a communication modality view that includes a user interface that displays user-to-user communications of active users of the group communication; and
    receiving a selection of the collaboration modality view, the gallery modality view, or the communication modality view that is different from the initial modality view,
        wherein each active user is on a different computing device with different active instances of the single communication application which are each configured to switch independently of each other active instances of the single communication application running on different computing devices to modality views that are different from the initial modality view; and
    displaying the selected modality view on the canvas by transitioning from the initial modality view.

2. The method of claim 1, further comprising scaling the selected modality view to a full screen size of the canvas by rearranging displayed components on the communication application user interface such that the selected modality view is presented with a priority on elements shown in the selected modality view.

3. The method of claim 1, wherein each of the different active instances of the single communication application running on the different computing devices all initially present the same initial modality view.

4. The method of claim 1, wherein receiving the selection of the collaboration modality view, the gallery modality view, or the communication modality view that is different from the initial modality view is received via a tap, a swipe, a tap and hold, a gesture, an audio command, an accelerometer related move of the computing device, a keyboard interaction, a mouse interaction, or a gesture detected through a video camera.

5. The method of claim 1, further comprising:
    identifying hardware on the computing device and the different computing devices supporting video streaming of each the active users; and
    automatically enabling a video stream of the active users with identified hardware supporting video streaming.

6. The method of claim 1, further comprising
    retaining session information of the initial modality view to restore a session of the initial modality view; and
    in response to detecting another user action selecting the initial modality view, displaying the initial modality view by applying the retained session information to restore the session.

7. The method of claim 1, wherein the user interface in the collaboration modality view includes a collaboration pane to display the item shared.

8. The method of claim 1, wherein the item shared amongst the plurality of active users of the group communication includes a user's desktop, a presentation, an audio file, or a video file.

9. The method of claim 1, further comprising listing, upon receiving an indicate from the user, a set of contacts from one or more contacts lists of one or more active users of the group communication to add as potential participants to the group communication.

10. The method of claim 9, further comprising determining the set of contacts from organizational relations by evaluating a frequency of conversations with the contacts.

11. The method of claim 1, wherein the each of the multiple modality views include navigational elements that, when selected by the user, switch to other available modality views not currently being displayed on the canvas.

12. The method of claim 1, further comprising displaying a participant pane of the initial modality view on the canvas, the participant pane including at least one of: an icon, a participant image, a user generated avatar, and a video stream associated with each active user of the group communication.

13. The method of claim 1, wherein the user-to-user communications comprise one or more of: text messaging communications, video messaging communications, and audio messaging communications.

14. A computing device with a single communication application supporting a communication application user interface having multiple modality views of different communication channels within a group communication between a plurality of users on different computing devices, the computing device comprising:
    a memory configured to store instructions; and a processor coupled to the memory, the processor executing a single communication application in conjunction with the instructions stored in the memory, wherein the single communication application comprises:
  a communication interface configured to facilitate communication between one or more users participating in the group communication via each of the different communication channels; and
  a canvas module configured to:
    generate a canvas that displays an initial modality view representing a first channel of communication within the group communication associated with the one or more users on a canvas of the communication application user interface,
      wherein the initial modality view is a collaboration modality view that includes a user interface that displays an item shared amongst a plurality of active users of the group communication, a gallery modality view that includes a user interface that displays each active user of the group communication, or a communication modality view that includes a user interface that displays user-to-user communications of active users of the group communication;
    receive a selection of the collaboration modality view, the gallery modality view, or the communication modality view that is different from the initial modality view,
      wherein each of the active users of the group communication are using different computing devices with different active instances of the single communication application that are each configured to switch independently of other active instances of the single communication application running on different computing devices to modality views that are different from the initial modality view; and
    display the selected modality view on the canvas by transitioning from the initial modality view.

15. The computing device of claim 14, wherein the canvas module is further configured to scale the selected modality view to a full screen size of the canvas by rearranging displayed components on the communication application user interface such that the selected modality view is presented with a priority on elements shown in the selected modality view.

16. The computing device of claim 14, wherein the canvas module is further configured to:
  switch to the gallery modality view with user interface that displays each active user of the group communication automatically in response to detecting a user initiating at least one from a set of: a voice call and a video call;
  switch to the collaboration modality view with the user interface that displays the item shared amongst the plurality of active users of the group communication in response to detecting at least one user sharing an item including at least one of: a desktop, a presentation, a file, an audio file, and a video file; and
  switch to the communication modality view with the user interface that displays user-to-user communications for one or more active users of the group communication automatically in response to detecting a user initiating a messaging component of the single communication application.

17. The computing device of claim 14, wherein the canvas module is further configured to display a set of the one or more users participating in the group communication in a horizontal arrangement showing each participating user in a participant pane adjacent to each other, wherein a scroll functionality is provided to enable display of a scrollable selection of the set to accommodate a width of the canvas.

18. The computing device of claim 14, wherein the canvas module is further configured to display a set of contacts in a horizontal arrangement below the plurality of users participating in the group communication in a participant pane, wherein a scroll functionality is provided to enable display of a scrollable selection of the set of contacts to accommodate to width of the canvas.

19. A system for managing modality views of a single communication application supporting multiple channels of a group communication via different modality views, the system comprising:
  a memory for storing executable program code; and
  a processor functionally coupled to the memory, the processor being responsive to computer-executable instructions contained in the executable program code and operative to:
    cause an initial modality view representing a first channel of communication within the group communication associated with one or more users on a canvas of a communication application user interface,
      wherein the initial modality view is a collaboration modality view that includes a user interface that displays an item shared amongst a plurality of active users of the group communication, a gallery modality view that includes a user interface that displays each active user of the group communication, or a communication modality view that includes a user interface that displays user-to-user communications of active users of the group communication;
    receive an indication of a selection of the collaboration modality view, the gallery modality view, or the communication modality view that is different from the initial modality view,
      wherein each of the active users of the group communication are using different computing devices with different active instances of the single communication application that are each configured to switch independently of other active instances of the single communication application running on different computing devices to modality views that are different from the initial modality view;
    generate the selected modality view; and
    cause the selected modality view to be displayed on the canvas by transitioning from the initial modality view and scale the selected modality view to a full screen size of the canvas by rearranging displayed components on the communication application user interface such that the selected modality view is presented with a priority on elements shown in the selected modality view.

20. The system of claim 19, wherein the processor being responsive to computer-executable instructions contained in the executable program code and further operative to:
  transcribe audio to text and display as messages in the communication modality view in response to detecting an audio conversation between the active users; and
  capture hand gestures used in sign language and present as at least one of: text messages and graphics describing the gestures subsequent to detecting a sign language conversation.

21. A method executed on a computing device for managing multiple modality views of communication channels supported by a single communication application with a communication application user interface that provides a group communication associated with a plurality of users, the method comprising:
- displaying, on a display of the computing device, an initial modality view associated with the group communication on a canvas of the communication application user interface,
    - wherein the initial modality view is a first view that includes a user interface that displays an item shared amongst a plurality of active users of the group communication, a second view that includes a user interface that displays each active user of the group communication, or a third view that includes a user interface that displays user-to-user communications of active users of the group communication; and
- receiving a selection to display the first view, the second view, or the third view that is different from the initial modality view,
    - wherein each active user is on a different computing device with different active instances of the single communication application which are each configured to switch independently of each other active instances of the single communication application running on different computing devices to modality views that are different from the initial modality view; and
- displaying the selected modality view on the canvas by transitioning from the initial modality view.

22. The method of claim 21, further comprising scaling the selected modality view to a full screen size of the canvas by rearranging displayed components on the communication application user interface such that the selected modality view is presented with a priority on elements shown in the selected modality view.

23. The method of claim 21, wherein each of the different active instances of the single communication application running on the different computing devices all initially present the same initial modality view.

24. The method of claim 21, wherein receiving the selection of the first view, the second view, or the third view that is different from the initial modality view is received via a tap, a swipe, a tap and hold, a gesture, an audio command, an accelerometer related move of the computing device, a keyboard interaction, a mouse interaction, or a gesture detected through a video camera.

25. The method of claim 21, further comprising:
- identifying hardware on the computing device and the different computing devices supporting video streaming of each the active users; and
- automatically enabling a video stream of the active users with identified hardware supporting video streaming.

26. The method of claim 21, further comprising
- retaining session information of the initial modality view to restore a session of the initial modality view; and
- in response to detecting another user action selecting the initial modality view, displaying the initial modality view by applying the retained session information to restore the session.

27. The method of claim 21, wherein the user interface in the first view includes a collaboration pane to display the item shared.

28. The method of claim 21, wherein the item shared amongst the plurality of active users of the group communication includes a user's desktop, a presentation, an audio file, or a video file.

29. The method of claim 21, further comprising listing, upon receiving an indicate from the user, a set of contacts from one or more contacts lists of one or more active users of the group communication to add as potential participants to the group communication.

30. The method of claim 9, further comprising determining the set of contacts from organizational relations by evaluating a frequency of conversations with the contacts.

31. The method of claim 21, wherein the each of the multiple modality views include navigational elements that, when selected by the user, switch to other available modality views not currently being displayed on the canvas.

32. The method of claim 21, further comprising displaying a participant pane of the initial modality view on the canvas, the participant pane including at least one of: an icon, a participant image, a user generated avatar, and a video stream associated with each active user of the group communication.

33. The method of claim 21, wherein the user-to-user communications comprise one or more of: text messaging communications, video messaging communications, and audio messaging communications.

34. An apparatus with a single communication application supporting a communication application user interface having multiple modality views of different communication channels within a group communication between a plurality of users on different computing devices, the apparatus comprising:
- a memory;
- a processor;
- a communication interface configured to facilitate communication between one or more users participating in the group communication via any of the different communication channels available in the single communication application; and
- a canvas module configured to:
    - generate a canvas that displays an initial modality view representing a first channel of communication within the group communication associated with the one or more users on a canvas of the communication application user interface,
        - wherein the initial modality view is a first view that includes a user interface that displays an item shared amongst a plurality of active users of the group communication, a second view that includes a user interface that displays each active user of the group communication, or a third view that includes a user interface that displays user-to-user communications of active users of the group communication;
    - receive a selection of the first view, the second view, or the third view that is different from the initial modality view,
        - wherein each of the active users of the group communication are using different computing devices with different active instances of the single communication application that are each configured to switch independently of other active instances of the single communication application running on different computing devices to modality views that are different from the initial modality view; and display the selected modality view on the canvas by transitioning from the initial modality view.

35. The computing device of claim 34, wherein the canvas module is further configured to scale the selected modality view to a full screen size of the canvas by rearranging displayed components on the communication application user interface such that the selected modality view is presented with a priority on elements shown in the selected modality view.

36. The computing device of claim 34, wherein the canvas module is further configured to:
    switch to the first view with user interface that displays each active user of the group communication automatically in response to detecting a user initiating at least one from a set of: a voice call and a video call;
    switch to the second view with the user interface that displays the item shared amongst the plurality of active users of the group communication in response to detecting at least one user sharing an item including at least one of: a desktop, a presentation, a file, an audio file, and a video file; and
    switch to the third view with the user interface that displays user-to-user communications for one or more active users of the group communication automatically in response to detecting a user initiating a messaging component of the single communication application.

37. The computing device of claim 34, wherein the canvas module is further configured to display a set of the one or more users participating in the group communication in a horizontal arrangement showing each participating user in a participant pane adjacent to each other, wherein a scroll functionality is provided to enable display of a scrollable selection of the set to accommodate a width of the canvas.

38. The computing device of claim 34, wherein the canvas module is further configured to display a set of contacts in a horizontal arrangement below the plurality of users participating in the group communication in a participant pane, wherein a scroll functionality is provided to enable display of a scrollable selection of the set of contacts to accommodate to width of the canvas.

* * * * *